United States Patent Office 3,472,786
Patented Oct. 14, 1969

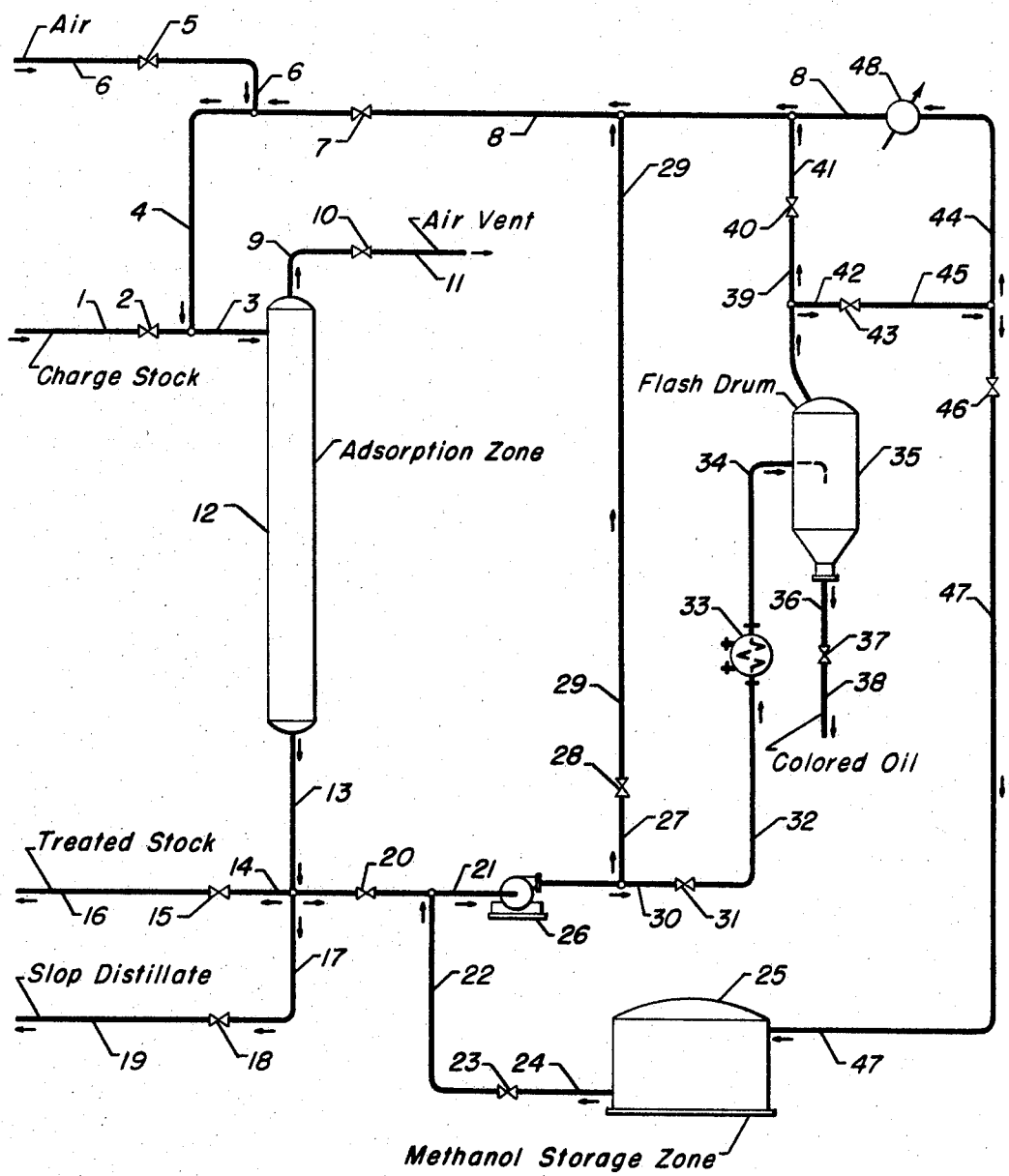

3,472,786
REGENERATION OF SPENT ADSORBENTS
Peter Urban, Northbrook, and Kenneth M. Brown, Arlington Heights, Ill., assignors to Universal Oil Products Company, Des Plaines, Ill., a corporation of Delaware
Continuation-in-part of application Ser. No. 389,129, Aug. 12, 1964. This application Apr. 13, 1966, Ser. No. 542,375
Int. Cl. B01d 15/06
U.S. Cl. 252—414                                        11 Claims

ABSTRACT OF THE DISCLOSURE

In the clay treating of petroleum distillates, the method of regenerating the spent bed of clay adsorbent which comprises condensing hot alcohol vapors in contact with said bed, which is initially cool; withdrawing the resulting liquid alcoholic effluent from the bed; vaporizing the liquid effluent and flash separating the resultant vapor to provide a contaminant-free alcoholic vapor phase and a contaminant-rich oil phase; and recycling the alcoholic vapor phase into contact with said adsorbent bed until no further substantial condensation takes place therein. The vapor phase treatment may be preceded by a liquid alcohol wash of the bed.

---

This application is a continuation-in-part of our copending application Ser. No. 389,129 filed Aug. 12, 1964, now abandoned.

The subject of the present invention is a process for the regeneration or revitalization of a bed of adsorbent material. More precisely, the present invention relates to a combination process which utilizes a condensing alcoholic vapor as an integral part of a regeneraation operation which is designed to desorb contaminants that have been adsorbed on a bed of adsorbent material through a complex capillary action mechanism. The conception of the present invention was facilitated by the recognition of the improved capillary penetration, and consequential flushing, associated with a condensing surface active vapor— as will be discussed in detail hereinafter. This recognition, in turn, led to the formulation of the present process which encompasses the passage of a condensing vapor phase boundary through a bed of adsorbent material, either alone or in conjunction with a separate prior liquid wash of the bed, with the result that effective and efficient removal of a substantial portion of the contaminants adsorbed on the bed is easily accomplished.

In the art of regenerating a bed of adsorbent material, major emphasis in the past has been focused on the selection of a suitable desorption solvent for the particular contaminants adsorbed on the specified bed of adsorbent material. The factors that entered into this determination were not only the type of the contaminants but also the physical characteristics of the adsorbent material—more particularly the nature of its capillary structure. Adding an additional dimension of complexity to this determination was the attendant problem of how to remove the washing fluid once it had performed its assigned task. This last problem was particularly acute when the washing fluid was capable of itself contaminating the stream being purified by use of the adsorbent bed, or was of major economic importance in the commercial feasibility of the process. Therefore, in situations of this latter type, means were examined which would allow removal of the desorbent solution. Prominent among the means that were investigated, were those that sought the introduction of heat into the bed through a heating operation which was designed to vaporize the entrapped solvent in the bed. It is especially to be noted that these heating processes, from the prior art, had in common the limited objective of removing entrapped washing fluid and were primarily directed at vaporization of the entrapped fluid once the regeneration operation was considered finished. Also it is evident from the nature of the contaminants, at least the phenolic components that are of special significance here as will be hereinafter explained, that a temperature that will vaporize the washing fluid will not necessarily vaporize any of the residual adsorbed contaminants primarily because of their polar nature, their generally higher molecular weight, and the mechanism of adsorption associated with their physical attachment to the adsorbent. A substantial difference between the vaporization temperature of the washing fluid and of the adsorbed contaminants is further evidenced by the necessity for a commercially acceptable regeneration process to separate the washing fluid from the contaminants for reuse in the process. This is commonly accomplished by distillation which requires a substantial vaporiaztion temperature difference for efficient separation. Thus, vaporization of the retained washing fluid will not ordinarily remove an additional portion of the adsorbed contaminant.

Our work in this area was prompted by a problem generated during our examination of the color degradation that generally accompanies sweetening of certain types of sour organic streams. Specifically, this problem was the removal of the colored bodies formed during a sweetening operation. Without unduly restricting our invention by this explanation, we believe that the presence of phenolic components during the sweetening operation can contribute to the marked degradation of color characteristics of the sweetened product. By phenolic components it is meant in general, unsubstituted or substituted aromatic hydrocarbons that are activated by one or more hydroxyl groups, such as: phenols, cresols, the amino phenols, the xylenols, the nitro phenols, the phenol sulfonic acids, the halogenated phenols, the alkyl substituted phenols, the naphthols, the hydroxy heterocyclic compounds, etc. These phenolic components, which are present in most sour organic streams (particularly kerosenes and other middle distillate range oils) are apparently oxidized, during the course of a mercaptan oxidation process to highly colored complex molecules. For instance, it is believed that the polyalkylphenols contained in these sour organic streams are oxidized to quinones which are highly colored compounds. Accordingly, in order to produce a product free from color degradation it is necessary to remove either the phenolic component precursors or the highly colored compounds produced during the sweeteing operation. We investigated the latter approach to this solution of the color degradation problem and found a preferential means for accomplishing this removal was to employ a bed of adsorbent material to filter the effluent from the sweetening zone.

In our subsequent examination of suitable adsorbent materials, we encountered a problem when we considered the available procedures to regenerate the adsorbent material. This regeneration problem was concerned initially with the selection of a washing or flushing fluid to be used to desorb the adsorbent bed. We found that certain surface active materials—particularly lower molecular weight alcohols—were in the liquid state highly effective at removing these highly colored compounds as compared to other classes of desorbing agents. But we also found that even these preferential desorbing agents did not remove all of the adsorbed materials, and in fact, there were substantial quantities of these materials left entrapped in the bed. Therefore, we explored means to improve the effectiveness of these preferred desorbing agents, and quite unexpectedly found that a condensing vapor of these preferred desorbing agents would, indeed, remove another portion of the adsorbed material, as will be hereinafter explained. Consequently, the present invention utilizes the beneficial effects of a condensing vapor of a specially selected surface active substance on a bed of adsorbent material in such a manner that significantly increased capillary pore penetration is accomplished with the attendant greater contact of the desorbing solvent with contaminants adsorbed on the bed.

It is to be carefully noted that the ancillary problem, which as previously explained was of substantial concern in the prior art, of solvent removal once the adsorbent material is regenerated, is inherently solved by the present invention since at the termination of the regeneration operation the bed of adsorbent material will be substantially full of vapors of the desorbing agent, with perhaps a minor amount of desorbing agent condensate entrapped in the intersticies of the bed.

Therefore, it is a principal object of the present invention to provide a regeneration process for a bed of adsorbent material that results in improved removal of adsorbed material. It is an additional principal object of the present invention to provide a regeneration process for a bed of adsorbent material that results in a superior removal of highly colored compounds of the type generated by a sweetening operation. A corollary objective is to provide a regeneration process which results in a substantial saving of desorbing agent.

In a broad embodiment the present invention involves a combination process for regenerating a bed of adsorbent material that has been utilized to remove at least one contaminant from a charge stock, which process comprises the steps of: passing an alcoholic vapor into said adsorbent bed and therein condensing at least a portion of said vapor in order to remove a substantial portion of said adsorbed contaminant; vaporizing the resulting liquid effluent from said bed and flash separating the resultant vapor to provide a substantially contaminant-free alcoholic vapor phase and a contaminant-rich oil phase; and recycling said contaminant-free alcoholic vapor phase to said adsorbent bed until no further substantial condensation takes place therein.

In another broad embodiment the present invention relates to the combination process for regenerating a bed of adsorbent material that has been utilized to remove at least one contaminant from a charge stock, which process comprises the steps of: passing a liquid alcohol into the bed in order to remove a portion of said adsorbed contaminant; vaporizing the resultant liquid effluent from said bed and flash separating the resultant vapor to provide a substantially contaminant-free alcoholic vapor phase and a contaminant-rich oil phase; condensing said substantially contaminant-free alcoholic vapor phase and recycling the resultant liquid alcohol to said adsorbent bed; terminating the recycling of the liquid alcohol to said absorbent bed when said liquid effluent from said adsorbent bed no longer contains a significant amount of said adsorbed contaminant; thereafter recycling at least a portion of said substantially contaminant-free alcoholic vapor phase directly to said adsorbent bed and therein condensing at least a portion of said vapor in order that an additional portion of said adsorbed contaminant is removed; and continuing said recycling of alcoholic vapor until no further substantial condensation will take place in said adsorbent bed.

Specific embodiments of this invention relate to particular process conditions, and mechanisms of effecting the process. These will be hereinafter discussed in the detained analysis of the elements and mechanisms that can be employed in the practice of the present invention which is coupled with the detailed discussion of one particular embodiment of the present invention that is illustrated in the attached drawing.

Without limiting the scope and spirit of the appended claims by this explanation, it appears that the improved extraction of contaminants that is observed as a result of using a condensing vapor wash is a product of a number of different factors. There is, first, the diffusion of the hot vapors through the fine capillary pores of the adsorbent material. It is well-known that diffusion is a consequence of random molecular motion and occurs whenever there is a concentration gradient of any molecular species and also whenever there is a temperature gradient (i.e. a gradient in random thermal velocity). Here, in the present invention there exists a gradient in concentration of the desorbing fluid along the pores of the bed and also, and perhaps of vastly more significance, there is a substantial temperature gradient along the capillary pores of the bed. This temperature gradient is produced when the hot vapors come in contact with the cold bed. This situation differs markedly from the case where the bed is heated by internal means in a gradual fashion, principally by a conduction mechanism, such that there is a steady increase in temperature of the bed until the evaporation temperature of the entrapped flushing fluid is reached at which point vaporization takes place and the vapor diffuses out of the pores of the bed. This is in sharp contrast to the present invention wherein the initial diffusion is into and along the pores of the bed with the attendant greater penetration of the bed. Still another factor that enters into the improved process of the present invention is, we believe, a condensation effect which is produced by the tendency of the vapors to fill open pores from the inside out thus increasing the contact of the desorbing solvent with the highly colored compounds and exerting an additional solubilizing force on these materials which is directed along the pores from the inside out. A final factor that contributes to the observed improved extraction is the fact that the closer proximity of molecules in a liquid state and a corresponding restriction of their movement results in lesser fluidity, whereas the present invention employs a hot vapor which, by its very nature, has a greater fluidity than a liquid and consequently has a much greater capability to penetrate the pores of the adsorbent material and thus achieve a superior contact with the contaminants entrapped in the pores of the bed.

Before considering in detail the various ramifications of the present invention, it is convenient to define several of the terms and phrases used in the specification and in the appended claims. In those instances where temperatures are given to boiling ranges and boiling points, it is understood that they have reference to those which are obtained through use of standard ASTM distillation methods. The phrase "gasoline boiling range" as used herein refers to a temperature range having an upper limit of about 400° F. to about 425° F. The term "middle distillate range" is intended to refer to a temperature range above the gasoline range but having an upper limit of about 650° F.—included in this range would be distillates and fractions that are called in the industry "heavy naphthas, fuel oils, jet fuels, etc." The term "kerosene" would also be a special case of a middle distillate range oil having an initial boiling point of about 300° F. to about 400° F., and an end boiling point of about 475° F. to about 550° F. The term "sweetening" as used herein denotes the process of treating a sour hydrocarbon fraction with an oxidizing agent at conditions designed to effect the oxidation of mercaptans to disulfides which are compounds having an unobjectionable or sweet odor compared to the original mercaptans. The term "hydrocarbon fraction or distillate" is intended to refer to a portion of a petroleum crude of a mixture of hydrocarbons, of a coal tar distillate, etc., that boils within a given temperature range. The term surface active material as used herein to refer to a material that is constructed out of molecules that have a portion which is oil-soluble and a portion which is water-soluble.

Input charge stocks for the purification or adsorption portion of the present adsorption/regeneration process may be any stream in which complex contaminants are present, which are generally highly colored and of a polar nature, and it is desired to remove these compounds from the stream. The novel process of the present invention is particularly applicable to the adsorption treatment of petroleum distillates and especially sweetened gasoline, including cracked gasoline, straight run gasoline, natural gasoline, or mixtures thereof; heavy and light naphthas; jet fuel; kerosene; aromatic solvents; stove oil; range oil; fuel oil; etc. Since the present invention is especially applicable as previously explained, to input streams that contain oxidation products of phenolic components, the input stream to the adsorption cycle of the present process will more frequently be an effluent stream from a sweetening operation that is particularly sensitive to color degradation such as a kerosene, jet fuel, stove oil, range oil, burner oil, gas oil, fuel oil, etc.

The novel method of the present invention may be used for the regeneration of any adsorbent which has become saturated with adsorbed materials. In general, the adsorbent comprises silica, alumina or mixtures thereof, which may be naturally occurring or synthetically prepared. Natural occurring clays include attapulgus clay, fuller's earth, bentonite, montmorillonite, kaolin, kieselguhr, etc. Other adsorbents include silica gel, alumina, bauxite, etc., and synthetic composites containing from about 5% to about 95% silica and about 95% to about 5% alumina, which composites may contain other compounds and particular metal oxides. An example of the synthetically prepared composite comprises the silica-alumina catalyst used commercially in cracking processes, and referred to in the art as cracking catalysts.

The present invention may be more clearly understood by reference to the accompanying drawing which illustrates one particular embodiment thereof. It is not intended, however, that the process of the present invention be unduly limited to the embodiment illustrated. In the drawing, certain flow valves, control valves, coolers, pumps, compressors, etc., have either been eliminated or reduced in number as not being essential to the complete understanding of the present process. The utilization of such miscellaneous items will immediately be recognized by one possessing the requisite skill within the art of petroleum processing technology.

Referring now to the drawing, the charge stock to be purified is introduced by way of line 1 through valve 2 and line 3 into adsorption zone 12 preferably through a suitable distributing device. In the case illustrated adsorption zone 12 contains a bed of clay, which as hereinbefore set forth may be naturally occurring or synthetically prepared. It is understood that the naturally occurring clay may be refined in any conventional manner to improve its adsorption properties prior to use in the present process.

For economic reasons it is preferred that purification of the charge in zone 12 be effected at ambient temperature and low pressures in order to avoid both the cost of heating and the cost of high pressure pumping, piping, valves, and treating towers. However, it is understood that a moderately elevated temperature, which generally will not exceed about 350° F., and a moderate superatmospheric pressure which generally will not exceed about 100 p.s.i.g. may be employed when advantages appear therefor. Thus, the clay treating generally is effected at a temperature of from about 50° F. to about 300° F., preferably 60° F. to about 120° F., and a pressure from atmospheric to about 100 p.s.i.g., preferably 2 to 25 p.s.i.g.

In the case here illustrated, the charge stock passes downwardly through the absorbent and is removed from zone 12 by way of lines 13 and 14, valve 15, and line 16 to storage or further processing as desired. While downward flow is illustrated, it is understood that upward flow through the clay bed may be employed and this may be accomplished by introducing the charge into the lower portion of zone 12, and withdrawing the purified charge from the upper portion of zone 12.

Contacting the charge with the clay or other adsorbent is continued until the adsorbent becomes at least partially saturated for this purpose. The exact degree of saturation will depend upon the extent of purification desired. This in turn will vary with the particular charge stock and with the particular type and quantity of impurities contained therein, as well as with the specific adsorbent used. In initial operations the degree of purification obtained may be determined by analysis of the product emitted from the treating zone. In most cases an arbitrary period of time for purification before regeneration will be established based upon the experience gained in the earlier operation.

When it becomes necessary to regenerate the adsorbent, the flow of charge through lines 1 and 3 is discontinued. In a preferred method a portion of the charge remaining in the treating tower then is blown out with air or nitrogen or in any other suitable manner. Referring to the drawing, air or other suitable material is introduced by way of line 6, valve 5, line 4, and then into absorption zone 12 via line 3. The charge and air from the adsorption zone are withdrawn through line 13 and passed by way of line 17, valve 18, and line 19 to storage or other disposal as desired. After removal of a substantial portion of the charge stock from the adsorption zone, the zone preferably is vented by opening valve 10 in line 9 and releasing the vapors to the atmosphere or elsewhere as desired.

While valve 10 is open, the adsorption zone, the zone in one embodiment is filled with liquid alcohol. While any suitable alcohol may be used, including ethanol, propanol, butanol, etc., methanol is particularly preferred because of its special desorption characteristics for the particular class contaminants mentioned hereinbefore. These special desorption characteristics of methanol are, we believe, a consequence of the fact that methanol is very surface active, coupled with the fact that methanol has a relatively small molecular cross-sectional area; these facts tends to enable methanol to penetrate into the capillary pore structure in a superior manner as compared with other commonly employed desorbing agents. In the case illustrated in the drawing, liquid methanol is introduced through line 24, valve 23, line 22, into line 21, through pump 26, through line 27, valve 28, line 29, into line 8, through valve 7, line 4, and line 3, into adsorption zone 12. It is understood that liquid methanol from storage may be passed directly into adsorption zone 12 in any other suitable manner not illustrated.

It is to be carefully noted that in another embodiment a liquid methanol wash is not used, and a regeneration process starts with the passage of liquid methanol through line 24, line 23, line 22, into line 21 through pump 26, line 30, valve 31, line 32, into vaporizer or heater 33, through line 34, into flash drum 35, through line 39, valve 40, line 41, into line 8, valve 7, line 4, and through line 3, into absorption zone 12. It is also to be noted that the methanol vapor does not necessarily have to be passed into the bed in downflow fashion, and that, in fact, in some cases upflow of the vapor may be used with condensate removal at bottom of bed in order to maximize the effect of thermal diffusion over all parts of the bed. In such fashion the regeneration operation commences with the novel and unique condensing vapor wash of the material in adsorption zone 12.

Returning now to the case where a liquid methanol wash is used, the methanol removes a portion of the contaminants from the adsorbent, and the methanol containing a portion of the contaminant is withdrawn from zone 12 through line 13, line 14, valve 20, line 21, through pump 26, line 30, valve 31, line 32, into heater 33 in which vaporization of the fluid takes place.

Heater or vaporizer 33 is illustrated as comprising a heat exchanger in which the methanol is passed into indirect exchange with a suitable heating medium, whereby the methanol is vaporized. Any suitable heating medium may be employed including steam, hot air, hot gas, etc., or when desired, an externally fired heater may be used for this purpose. Methanol vaporizes at about 150° F. and accordingly the methanol will be heated to this or slightly higher temperatures. The alcohol vapor is then passed through line 34 to flash drum 35 preferably through a dip leg.

In drum 35 the vapors are flash separated from the contaminants. The term "flash separation" defines the separation of vapors from liquid in a single stage, which is the type of separation occuring in flash drum 35. The contaminants are then withdrawn either continuously or intermittently from drum 35 by way of line 36, valve 37 and line 38 to storage or elsewhere as desired. The alcohol vapor, substantially free of contaminants, is withdrawn from the upper portions of drum 35 by way of line 39 and are passed through line 42, valve 43, and line 45 into condenser 48. Any suitable method is employed in condenser 48 to cool the alcohol vapor, condense it, and cool the resultant liquid. The cooled liquid alcohol is then passed through line 8, valve 7, line 4, and line 3, into adsorption zone 12. This recycling of the liquid alcohol to the adsorbent bed is terminated when the liquid effluent from the adsorption zone no longer contains a significant amount of the adsorbed contaminant.

When the adsorbent in adsorption zone 12 is at least partially regenerated, a portion of the alcohol vapor from flash drum 35 is passed directly through line 39, valve 40, line 41, line 8, valve 7, line 4, line 3, and into adsorption zone 12. In another embodiment not illustrated in the drawing the alcoholic vapor may be passed through a super heater to further raise its temperature and thus increase their penetration capability as hereinbefore explained. This increased penetration, or at least the thermal component of it, can be enhanced by passing the vapor into the bed in upflow fashion rather than downflow as illustrated in the attached drawing. In adsorption zone 12, the heated vapors contact the relatively cool bed of material and penetrate into the pores, condense therein, and extract a further portion of the adsorbed material. The recycling of the alcoholic vapor is continued until the adsorbent bed reaches a temperature such that no further substantial condensation will take place therein. Any excess alcohol that is generated during this process is withdrawn after it condenses in condenser 48 from the system through line 44, valve 46, line 47 into methanol storage zone 25. Although not illustrated in the drawing, the withdrawal of excess liquid methanol to storage or elsewhere as desired preferably is effected automatically by means of suitable pressure controller or otherwise. When pump 26 loses suction due to the lack of a substantial amount of condensation in the now hot bed of adsorption zone 12, valves 20 and 7 will be closed to disconnect the alcohol circulation system from the treating zone. The treating zone is now ready for resumption of its function of purification of additional charge stock, which charge stock will be introduced by way of lines 1 and 3 etc.

It will be noted that the novel method hereinbefore set forth provides a ready improved method of regeneration spent adsorbent without evcessive loss of alcohol solvent. As hereinbefore set forth the adsorbent zone after regeneration is substantially filled with alcohol vapor, with perhaps a small amount of liquid alcohol entrapped in the bed, which when added together constitute a very small quantity of alcohol as compared to the much higher quantity of liquid alcohol that is ordinarily present in the adsorption bed at the end of the strictly liquid wash regeneration process.

It is to be kept in mind that the exact selection of the particular variables of concern in the present process are at least partially dependent upon the physical and/or chemical characteristics of the charge stock and adsorbent being subjected to the present purification/regeneration process and as such have to be individually determined for each particular type of charge stock and adsorbent meterial.

The following examples are given to illustrate further the process of the present invention, and indicate the benefits to be afforded by the utilization thereof. It is understood that the examples are given for the sole purpose of illustration and are not considered to limit the generally broad scope and spirit of the appended claims.

Example I

This example describes a clay treating and regeneration system as illustrated in the attached drawing. In this example the charge stock to the clay treating zone is a sweetened commercial kerosene which contains contaminants which adversely effect its color characteristics. The kerosene at ambient temperatures is percolated downwardly through the clay bed at a liquid hourly space velocity of about 1. Approximately 800 barrels of kerosene are treated per ton of clay. After this time the flow of kerosene through the clay material is discontinued and the adsorption zone is blown with air at ambient temperature. The clay tower is filled with liquid methanol during which time the air in the tower is vented and the methanol then is withdrawn from the bottom of the clay tower and heated in the vaporizer to about 170° F. at a pressure of about 5 pounds per square inch. The methanol vapor and oil droplets are flash-separated in drum 35. The alcohol vapor is withdrawn from the upper portion of drum 35, condensed and the resultant cooled liquid alcohol is recycled back to the adsorption zone. This recycling is continued until approximately a total of about 5 volumes of methanol is contacted with the clay. The condenser then is by-passed and the methanol vapors are passed directly into the treating tower to partially condense therein. The alcohol condensate admixed with entrapped liquid alcohol is withdrawn from adsorption zone 12 and is flash-separated as before. The vapor wash of the adsorbent is continued until the adsorbent bed reaches a temperature such that no further condensation will take place therein. At this point the hot adsorption zone is substantially filled with alcoholic vapor with minor amounts of entrapped liquid alcohol present in the capillary structure of the bed, and the bed is ready to be returned to an onstream condition.

Example II

This example illustrates another embodiment of the present invention in which hot vapor is used alone to wash the adsorbent material within adsorption zone 12. In this example the charge to the clay treating tower is, as before, a commercial kerosene which contains contaminants which degrade the color characteristics of the kerosene. The sweetened kerosene at ambient temperatures is percolated downwardly through the clay bed at a liquid hourly space velocity of about one. Approximately 800 barrels of kerosene are treated per ton of clay. After this time the flow of kerosene through the clay tower is discontinued and the clay bed is blown with air at ambient temperatures. After venting, the clay tower is subjected to a hot methanol vapor wash using vapor generated in heater 33 as explained in detail hereinbefore. The hot vapor condenses on the cold bed desorbing a substantial portion of the adsorbed material from the bed. The condensation initially takes place in the upper region of the bed with condensate being withdrawn through line 13, through pump 26 and revaporized in heater 33. It is then flash separated and recycled as explained hereinbefore. As the clay bed is heated up in temperature the condensing phase boundary moves lower and lower through the bed of material until finally a point is reached at which the temperature of the bed is essentially at the temperature of the entering vapor. At this point no further substantial condensation will be taking place in the bed and the alcohol circulation system then is disconnected from the bed. The bed then is substantially regenerated and ready to be returned to an onstream condition.

We claim as our invention:

1. A process for regenerating a spent bed of adsorbent material that has been utilized to remove a contaminant from a charge stock, said bed having a one end and another end and being at least partially saturated with said contaminant, which comprises the steps of:
   (a) discontinuing the flow of said charge stock to said bed;
   (b) passing an alcoholic vapor at elevated temperature into the one end of said adsorbent bed, the latter being initially at a lower temperature than said vapor, and therein condensing said vapor by contact with the bed to remove said adsorbed contaminant;
   (c) withdrawing the resulting contaminant-containing liquid alcoholic effluent from said bed, vaporizing said liquid effluent in a vaporization zone separate from said bed, and flash separating the resultant vapor to provide a substantially contaminant-free alcoholic vapor phase and a contaminant-rich oil phase;
   (d) recycling said contaminant-free alcoholic vapor phase to the one end of said adsorbent bed, thereby developing within the bed a condensing vapor phase boundary which moves therethrough from said one end toward said other end, while simultaneously increasing the temperature of the bed solely by contact with said alcoholic vapor phase, and
   (e) continuing steps (c) and (d) until said adsorbent bed reaches a temperature such that no further substantial condensation of said alcoholic vapor takes place therein.

2. The process of claim 1 further characterized in that said charge stock is a hydrocarbon fraction boiling above the gasoline range.

3. The process of claim 1 further characterized in that said adsorbent material is a natural clay.

4. The process of claim 1 further characterized in that said alcoholic vapor is methanol.

5. The process of claim 12 further characterized in that said charge stock is an effluent stream from a sweetening process.

6. The process of claim 1 further characterized in that said adsorbent material is a synthetic composite containing silica.

7. A process for regenerating a spent bed of adsorbent material that has been utilized to remove a contaminant from a charge stock, said bed having a one end and another end and being at least partially saturated with said contaminant, which comprises the steps of:
   (a) discontinuing the flow of said charge stock to said bed;
   (b) passing a liquid alcohol into the bed to remove a portion of said adsorbed contaminant;
   (c) withdrawing the resulting contaminant-containing liquid effluent from said bed, vaporizing said liquid effluent in a vaporization zone separate from said bed, and flash separating the resultant vapor to provide a substantially contaminant-free alcoholic vapor phase and a contaminant-rich oil phase;
   (d) condensing said alcoholic vapor phase in a condensation zone separate from said bed and recycling the resultant liquid alcohol to said adsorbent bed;
   (e) terminating the recycling of the liquid alcohol to said adsorbent bed when the liquid effluent therefrom no longer contains a significant amount of said adsorbed contaminant;
   (f) thereafter passing at least a portion of said substantially contaminant-free alcoholic vapor phase at elevated temperature directly to the one end of said adsorbent bed, the latter being initially at a lower temperature than said vapor, and therein condensing said vapor by contact with said bed and extracting an additional portion of said adsorbed contaminant;
   (g) withdrawing the resulting contaminant-containing liquid alcoholic effluent from said bed, vaporizing said liquid effluent in said vaporization zone, and flash separating the resultant vapor to provide a substantially contaminant-free alcoholic vapor phase and a contaminant-rich oil phase;
   (h) recycling said contaminant-free alcoholic vapor phase to the one end of said adsorbent bed, thereby developing within the bed a condensing vapor phase boundary which moves therethrough from said one end toward said other end, while simultaneously increasing the temperature of the bed solely by contact with said alcoholic vapor phase; and
   (i) continuing steps (g) and (h) until said adsorbent bed reaches a temperature such that no further substantial condensation of said alcoholic vapor takes place therein.

8. The process of claim 7 further characterized in that said charge stock is a hydrocarbon fraction boiling above the gasoline range.

9. The process of claim 7 further characterized in that said adsorbent material is a natural clay.

10. The process of claim 7 further characterized in that said alcohol is methanol.

11. The process of claim 7 further characterized in that said charge stock is an effluent stream from a sweetening process.

References Cited

UNITED STATES PATENTS

| | | | |
|---|---|---|---|
| 2,128,931 | 9/1938 | Ferris et al. | 208—305 |
| 2,236,679 | 4/1941 | Ferguson et al. | 208—305 |
| 2,352,064 | 6/1944 | Zerbe | 208—305 |
| 2,647,858 | 8/1953 | Weisz | 208—305 |
| 2,784,238 | 3/1957 | Jacobs | 252—414 |
| 2,908,639 | 10/1959 | Carter et al. | 208—305 |
| 2,949,421 | 8/1960 | Mills | 252—414 |
| 3,090,816 | 5/1963 | Denton | 252—414 |

FOREIGN PATENTS 249,871    2/1927    Great Britain.

DELBERT E. GANTZ, Primary Examiner

G. J. CRASANAKIS, Assistant Examiner

U.S. Cl. X.R.

208—189